United States Patent [19]

Usui et al.

[11] Patent Number: 4,795,114
[45] Date of Patent: Jan. 3, 1989

[54] STATIONARY CLAMPING DEVICE

[75] Inventors: Masayoshi Usui, Numazu; Katsushi Washizu, Nagasawa, both of Japan

[73] Assignee: Usui Kokusai Sangyo Kabushiki Kaisha, Nagasawa, Japan

[21] Appl. No.: 78,234

[22] Filed: Jul. 27, 1987

[30] Foreign Application Priority Data

Aug. 19, 1986 [JP] Japan .............................. 61-126279[U]
Nov. 17, 1986 [JP] Japan .............................. 61-176540[U]

[51] Int. Cl.⁴ .............................................. E21F 17/02
[52] U.S. Cl. ..................................... 248/62; 248/74.1
[58] Field of Search ........................ 248/49, 61, 62, 63, 248/65, 68.1, 74.1, 74.2, 74.3; 24/545, 563; 174/DIG. 8

[56] References Cited

U.S. PATENT DOCUMENTS

| | | | |
|---|---|---|---|
| 3,334,851 | 8/1967 | Cassidy | 248/74.3 X |
| 3,421,187 | 1/1969 | Ryder | 248/74.3 X |
| 3,454,247 | 7/1969 | Geisinger | 248/74.3 X |
| 3,632,069 | 1/1972 | Thayer | 248/74.3 X |
| 4,174,563 | 11/1979 | Simpson | 174/DIG. 8 X |
| 4,303,216 | 12/1981 | Hollingsead | 248/74.3 |
| 4,306,760 | 12/1981 | Testa | 174/DIG. 8 X |
| 4,424,411 | 1/1984 | Clabburn | 174/DIG. 8 X |
| 4,428,893 | 1/1984 | Cummings | 248/74.3 X |
| 4,594,755 | 6/1986 | Ball | 174/DIG. 8 |

Primary Examiner—J. Franklin Foss
Attorney, Agent, or Firm—Anthony J. Casella; Gerald E. Hespos

[57] ABSTRACT

A stationary clamping device for fast attachment of a tubular article such as a metallic tube, a resinous tube, or a wire harnessing member to a basal surface comprises a clamp proper formed of a platelike fitting wall possessing a fitting hole intended for union of the clamp proper and the basal surface and a socket member of a small length made of a thermally shrinking material and adapted to tack the engaging wall and the end part jointly in an enclosed state. The fast attachment is attained by setting the tubular article on the engaging wall, collectively tacking the set portion of the tubular article and the immediate vicinity thereof with a socket member of thermally shrinking material, and heating the socket member or the set components thereby causing thermal shrinkage of the socket, contraction of the tacked components, and immobilization of the tubular article.

9 Claims, 4 Drawing Sheets

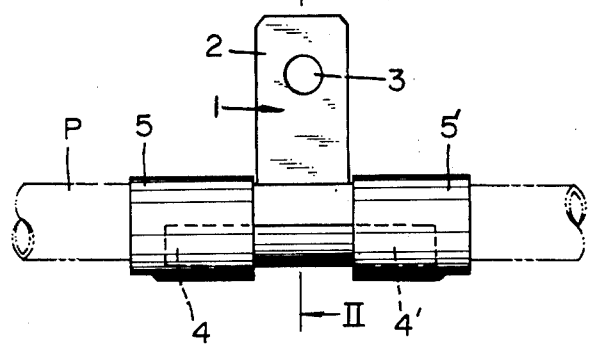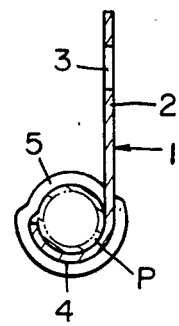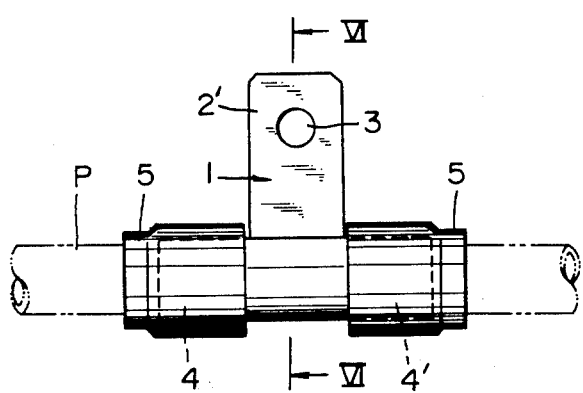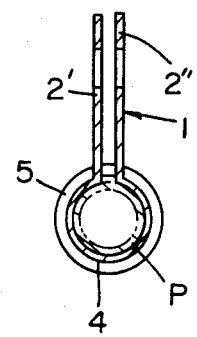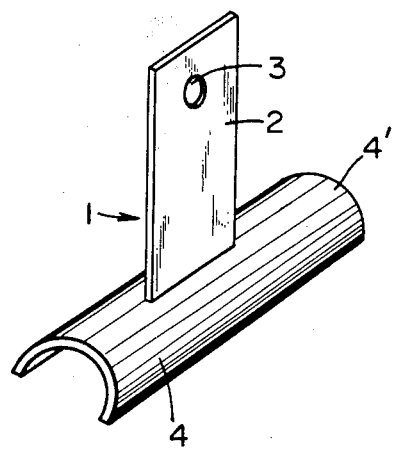

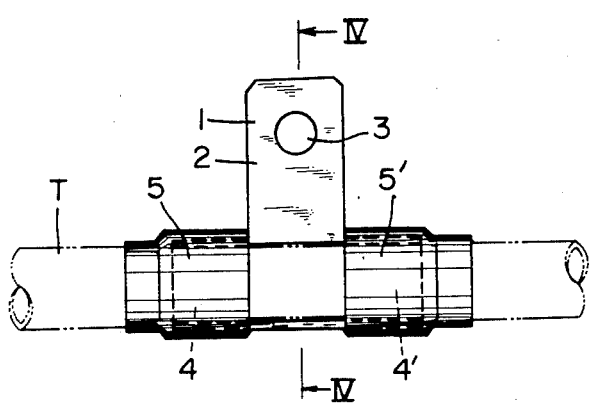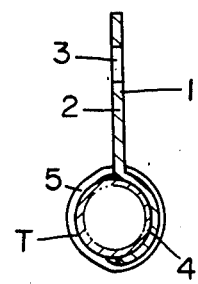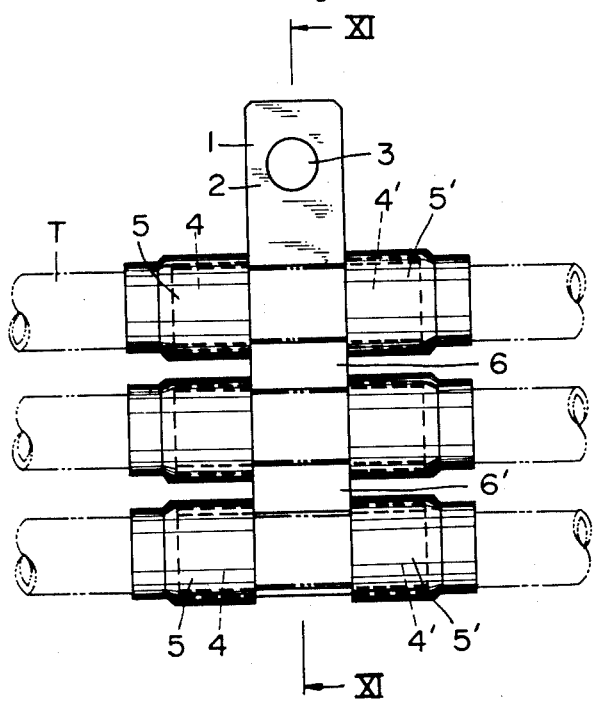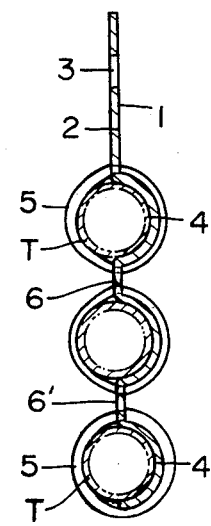

STATIONARY CLAMPING DEVICE

BACKGROUND OF THE INVENTION

1. Field of the Invention

This invention relates to a stationary clamping device for fastening to a basal surface tubular articles such as metallic tubes or resinous tubes or rodlike articles such as wire harnessing members severally having relatively small diameters not exceeding the level of about 20 mm and used copiously for supply of oils and gases generally in an automobile or a varying machine or installation. More particularly, this invention relates to improvements in and concerning the mechanism for fastening such tubular articles as mentioned above.

2. Description of the Prior Art

Heretofore, as clamping devices of this kind, there have been known a device which, by means of a clamp proper (11) provided with engaging grooves (14) defined by raised nipping walls on one surface of a fitting wall (12) incorporating therein a fitting hole, members (T') of metallic or resinous tube subjected to attachment are set fast as nipped in the grooves (14) as illustrated in FIG. 14 and a device which, by means of a clamp proper (11') provided with projecting walls (14' and 14") at the opposite ends in the direction of width of a fitting wall (12') incorporating therein a fitting hole (13'), a member (T") such as a wire harnessing member is set fast by enabling this member to be joined to the projecting walls with an adhesive tape (15), for example, as illustrated in FIG. 15.

Such conventional clamping devices as mentioned above, however, have problems. The former device has a disadvantage that since the members (T') subjected to fast attachment are manually pressed down during the course of setting and generally are not nipped in position with sufficient force, the members (T') in the set state, on exposure to vibration, for example, are often suffered to be displaced through translation in the axial direction or rotation in the circumferential direction and the engaging grooves (14) are consequently suffered to separate from the members. The latter device has a disadvantage that the adhesive tape (15), during the course of protracted use, is deteriorated by the effect of aging or softened on exposure to heat, often with the result that the adhesive tape will peel off the projecting walls.

SUMMARY OF THE INVENTION

For highly effective solution of the problems suffered by the clamping devices of prior art mentioned above, the present invention aims to provide a stationary clamping device which has at least one engaging wall of the clamp proper thereof integrally disposed in the direction of width of a fitting wall so that when a tubular article such as a metallic or resinous tube or a wire harnessing material subjected to attachment is set on the engaging wall part thereof and the set portion of the tubular article and the immediate vicinity thereof including the aforementioned engaging wall part are collectively tacked with a socket member made of thermally shrinking material and then the tubular article is immobilized by thermally shrinking the tacked part, the tubular article can be fastened very firmly and certainly and the tubular article in the fastened state, even on protracted exposure to vibration, will not be suffered to move out of place through translation or rotation or separate and come off the clamp proper.

In accordance with this invention, in a clamp proper of metallic or resinous material which comrises a plate-like fitting wall containing a fitting hole intended to permit union of the clamp proper with a basal surface and at least one engaging wall disposed integrally in the direction of length of the fitting wall and extended both ways in the direction of width of the fitting wall, a tubular article such as a metallic or resinous tube or a wire harnessing member is set on the aforementioned engaging wall of the clamp proper.

The set portion of the tubular article and the immediate neighborhood thereof including the aforementioned engaging wall are collectively tacked with a separate socket member of the shape of a short tube or a ring and the socket member is thermally shrunken to compress the tacked components and immobilize the tubular article. The stationary clamping device is completed by having a plurality of such engaging walls parallelly disposed as spaced from each other or having the engaging walls adjacently disposed either longitudinally or vertically relative to the direction in which the fitting walls are disposed.

The other objects and characteristic features of the present invention will become apparent to those skilled in the art as the disclosure is made in the following description of preferred embodiments of the invention, as illustrated in the accompanying drawings.

BRIEF DESCRIPTION OF THE DRAWINGS

FIG. 1 is a side view illustrating a typical stationary clamping device as one embodiment of this invention in a state applied to a metallic tube.

FIG. 2 is a cross section is a cross section taken through FIG. 1 along the long II—II.

FIG. 5 is a side view illustrating another modification of the embodiment of FIG. 1.

FIG. 6 is a cross-section taken through FIG. 5 along the line VI—VI.

FIG. 7 is a perspective view illustraing another modification of the embodiment of FIG. 1.

FIG. 8 is a side view illustrating typical stationary clamping device as another embodiment of the present invention in a state applied to a resinous tube or a wire harnessing member.

FIG. 9 is a cross section taken through FIG. 8 along the line VII—VII.

FIG. 10 is a side view illustrating a modification of the embodiment of FIG. 8.

FIG. 11 is a cross section taken through FIG. 10 along the line IX—IX.

DETAILED DESCRIPTION OF THE INVENTION

Figure 3:
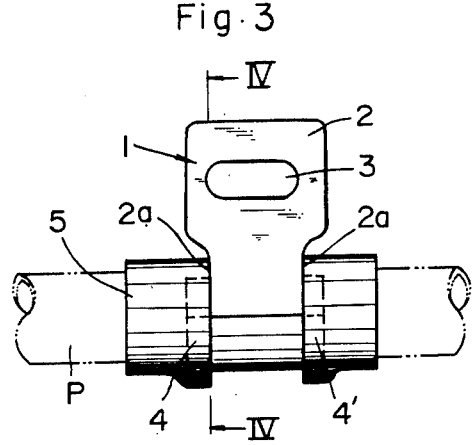
FIG. 3 is a side view illustrating one modification of the embodiment FIG. 1.

FIGS. 1 through 13 are diagrams illustrating embodiments of the present invention. In these diagrams, like parts are denoted by like reference numerals.

FIGS. 1 through 7 illustrates one embodiment of the present invention applied to a metallic tube. In the diagrams, (1) denotes a press molded metallic or injection molded resinous clamp proper comprising a platelike fitting wall (2) possessing a fitting hole (3) for insertion as of a bolt being used for union of the fitting wall and a basal surface and engaging walls (4, 4') curved in an incomplete circular cross section, disposed at the lower side of the fitting wall (2), and projected at least one way in the direction of width of the fitting wall (both ways in the illustrated embodiment). Desired fast attachment of a metallic tube (P) subjected to the attachment to the basal surface is accomplished by setting the metallic tube (P) in a state mounted on the engaging wall part and, by means of socket members (5, 5') separately formed of a thermally shrinking material in the shape of a short tube or a ring and preparatorily incorporated on the metallic tube (P) side, collectively tacking the set portion of the metallic tube (P) and the immediate vicinity thereof including the engaging walls (4, 4'), and heating the entire device or only the tacked components to the thermally shrinking temperature of the material of the socket members thereby causing thermal shrinkage of the sockets (5, 5') and consequent contraction of the tacked components and immobilization of the metallic tube (P).

The thermally shrinking material mentioned above is a thermally shrinking synthetic resin which, on being heated, shrinks at a ratio in the range of 1.3~4:1 and undergoes a dimensional change in the range of $< \pm 5$ to $\pm 10\%$. It is desired to be as flexible as the inner tube and possess high resistance to oil, chemicals, and pressure. As examples satisfying the requirement include cross-linked polyolefin resins and fluorine resins. As examples of the thermally shrinking material which proves to be satisfactory flexibility, restitution, recovery from deformation, resistance to crack by flexion, and wear resistance, there may be cited synthetic rubbers. The cross-linked polyolefin resins are products obtained by irradiating polyolefins with a high-energy electron beam thereby cross-linking adjacent polymer molecules and giving rise to a three-dimensional reticular structure. For example, they are marketed under various trademark designations such as Pentube, Insultite, Thermofit Tube, and Sumitube. Examples of fluorine resins are ethylene tetrafluoride (marketed under trademark designation of "Teflon TFE"), ethylene tetrafluoride-propylene hexafluoride copolymer resin, ethylene fluoride resin possessing a side chain of a perfluoroalkoxy group, ethylene-ethylene tetrafluoride copolymer resin, and vinylidene fluoride resin which are marketed under product series designation of "Pentube." Examples of the synthetic rubbers include chloroprene rubber marketed under trademark designation of "Neoprene") and cross-linked fluorine rubber marketed under trademark designation of "Baiton").

Figure 4:
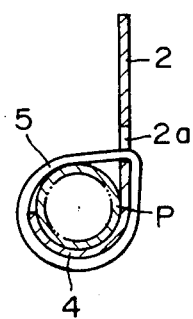
FIG. 4 is a cross section taken through FIG. 3 along the line IV—IV.

As shown in FIGS. 3 and 4, the fitting wall (2) may be provided on its both sides with recessed parts 2a, 2a) and the length of the engaging walls (4, 4') may be shortened, thereby saving the material of the clamp proper to produce the clamping device at a lower cost.

FIG. 4 and FIG. 5 illustrate one modification of the embodiment of the present invention described above. As illustrated in the diagrams, a pair of platelike fitting walls (2', 2'') are opposed to each other to give shape to the aforementioned clamp proper (1) and engaging walls (4, 4') formed as extended downwardly from the fitting walls are curved in a substantially circular cross section. FIG. 5 illustrates another modification of the embodiment, having metallic engaging walls (4, 4') and a metallic fitting wall produce separately from each other and subsequently joined fast as by welding, for example.

In the modified embodiment described above, desired fast attachment of the metallic tube (P) is accomplished by setting the metallic tube (P) in a state mounted on the engaging walls (4, 4') of the clamp proper (1), moving the laterally opposite socket members (5, 5') in mutually opposite directions thereby collectively tacking the set part of the metallic tube (P) and the immediate vicinity thereof including the engaging walls (4, 4'), passing the resultant assembly through an oven thereby heating the entire assembly or only the tacked components and consequently causing thermal shrinkage of the socket members (5, 5'), contraction of the tacked components, and immobilization of the metallic tube (P).

Now, another embodiment of this invention applied to a resinous tube or wire harnessing member will be described below with reference to FIGS. 8 through 13. In the embodiment of FIGS. 6 through 11, similarly to the embodiment of FIGS. 1 through 5, (1) denotes a press molded metallic or injection molded resinous clamp proper comprising a platelike fitting wall (2) possessing a fitting hole (3) for insertion as of a bolt being used for union of the fitting wall (2) and the basal surface and engaging walls (4, 4') of a semicircular cross section integrally formed in the direction of length of the fitting wall (2) and projected in the direction of width of the fitting wall. Desired fast attachment of a tubular article (T) such as a resinous tube or wire harnessing member is accomplished by setting the tubular member (T) on the engaging wall part and, by means of separate socket members (5, 5') formed of a thermally shrinking material in the shape of a short tube or a ring and preparatorily incorporated on the tubular article (T) side, collectively tacking the set portion of the tubular article (T) and the immediate vicinity thereof including the engaging walls (4, 4'), and heating the entire resultant assembly or only the tacked components to the thermally shrinking temperature of the material of the socket members (5, 5') thereby causing thermal shrinkage of the socket members (5, 5'), contraction of the tacked components, and immobilization of the tubular article (T).

Figure 12:
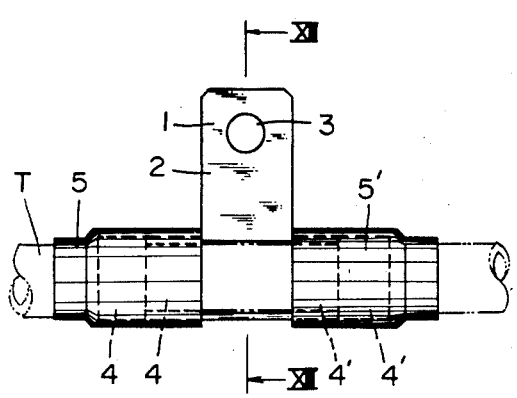
FIG. 12 is a side view illustrating another modification of the embodiment of FIG. 8.
Figure 13:
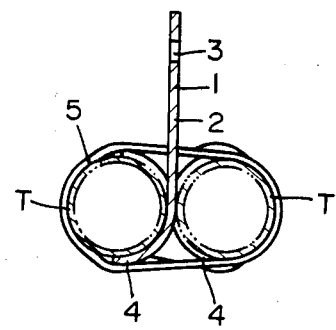
FIG. 13 is a cross section taken through FIG. 12 along the line XI—XI.
Figure 14:
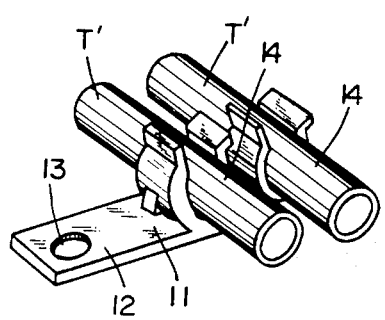
FIG. 14 and FIG. 15 are perspective views severally illustrating stationary clamping devices of prior art.
Figure 15:
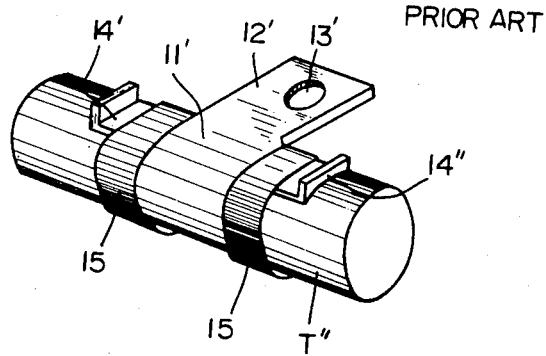

FIG. 10 and FIG. 11 illustrate one modification of the embodiment described above, having a plurality of pairs of engaging walls (4, 4') of the foregoing description parallelled at intervals (6, 6'). FIG. 12 and FIG. 13 illustrate another modification of the embodiment, having the engaging walls disposed as displaced one on the front side and the other on the rear side relative to the fitting wall (2). Of course, for the sake of design, the engaging walls may be disposed as mutually displaced in the vertical direction relative to the fitting wall (2). Optionally, a convenience may be attained by applying adhesive agent to the inner wall surface of the aforementioned socket members (5, 5') without departing from the spirit of this invention. Though the illustrated embodiment contemplates using engaging walls (4, 4') curved in a semicircular cross section. Optionally, these engaging walls may be formed in a V-shape cross section, in a cross section of the shape of three sides of a square, or in an incompletely circular cross section in the embodiment of FIGS. 1 through 6.

Also with the embodiment of FIGS. 8 through 13, desired fast attachment of a tubular article (T) is accomplished by circumferentially setting the tubular article (T) in the engaging walls (4, 4') of the clamp proper (1), moving the laterally opposite socket members (5, 5') in the mutually opposite direction thereby collectively tacking the set portion of the tubular article (T) and the immediate vicinity including the engaging walls, and heating the tacked components thereby causing thermal shrinkage of the socket members (5, 5'), contraction of the tacked components, and immobilization of the tubular article (T).

The stationary clamping device contemplated by the present invention effects fast attachment of a tubular article (T) such as a metallic tube, resinous tube, or a wire harnessing member, as described above, by setting the tubular article (T) in at least one pair of engaging walls (4, 4'), collectively tacking the set portion of the tubular article (T) and the immediate vicinity thereof, and heating the aforementioned socket members (5, 5') thereby causing thermal shrinkage of the socket members, contraction of the tacked components, and immobilization of the tubular article (T). Owing to the incompletely circular or semicircular cross section of the engaging walls (4, 4'), therefore, the tubular article (T) can be set in the circumferential direction on the engaging walls with an extremely easy work. Further, when the tubular article (T) happens to be a resinous tube requiring application of heat during the bending work thereof, the heating to be effected for causing the thermal shrinkage of the socket members (5, 5') can be utilized additionally for the purpose of the bending work, ensuring a marked improvement in productivity. Moreover, owing to the contraction of the tacked components obtained in consequence of the thermal shrinkage of the socket members, the tubular article (T) can be immobilized firmly and certainly. The tubular article (T) thus attached fast to the given basal surface, even on protracted exposure to vibration, is not suffered to move out through translation or rotation or separate and come off the clamp proper.

Thus, there is provided in accordance with the present invention a stationary clamping device which has the advantages discussed above. The embodiments described are intended to be purely illustrative, not limitative, of the invention and persons of ordinary skill in the art, therefore, are enabled to make variations and modifications thereof without departing from the spirit and scope of the invention. All such modifications are embraced in the scope of the claims appended hereto.

What is claimed is:

1. A stationary clamping device, comprising a clamp proper formed of a platelike fitting wall possessing a fitting hole intended for union of said clamp proper and a given basal surface and at least one engaging wall having an incomplete circular cross section and projected at least in one way in the direction of width of said fitting wall; a member for attachment to said engaging wall, said member having an outer peripheral surface which is in face contact with an inner peripheral surface of said engaging wall; and at least one socket member of a small length and a width wider than that of said engaging wall and made of a thermally shrinking resin or synthetic rubber material and adapted to tack said engaging wall and said end part jointly in an enclosed state, which clamping device effects fast attachment of said member for attachment to said engaging wall by heating said socket member.

2. The device according to claim 1, wherein said engaging walls possess a semicircular cross section.

3. The device according to claim 1, wherein said clamp proper is made of press molded metal.

4. The device according to claim 1, wherein said clamp proper is made of resin by injection molding.

5. The device according to claim 1, wherein said member for attachment is a metallic tube.

6. The device according to claim 1, wherein said member for attachment is a resinous tube.

7. The device according to claim 1, wherein said member for attachment is a wire harnessing member.

8. The device according to claim 1, wherein a plurality of engaging walls are substantially paralleled with intervals in a projected state.

9. The device according to claim 1 comprising a plurality of said socket members for engagement respectively with spaced apart locations on said engaging wall.

* * * * *